United States Patent
Lin

(10) Patent No.: US 12,046,216 B2
(45) Date of Patent: Jul. 23, 2024

(54) DISPLAY UPDATING SYSTEM AND DISPLAY

(71) Applicant: REALTEK SEMICONDUCTOR CORPORATION, Hsinchu (TW)

(72) Inventor: Yuh-Wey Lin, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/965,980

(22) Filed: Oct. 14, 2022

(65) Prior Publication Data

US 2023/0122657 A1     Apr. 20, 2023

(30) Foreign Application Priority Data

Oct. 19, 2021   (TW) .................................. 110138774

(51) Int. Cl.
*G09G 5/00*     (2006.01)
*G06F 13/40*    (2006.01)

(52) U.S. Cl.
CPC ......... *G09G 5/006* (2013.01); *G06F 13/4022* (2013.01); *G06F 2213/0042* (2013.01); *G09G 2320/08* (2013.01)

(58) Field of Classification Search
CPC ............... G09G 5/006; G09G 2320/08; G06F 13/4022; G06F 2213/0042
See application file for complete search history.

(56) References Cited

U.S. PATENT DOCUMENTS

| | | | |
|---|---|---|---|
| 8,890,877 B2 | 11/2014 | Fu | |
| 2009/0222807 A1* | 9/2009 | Fu | G06F 8/65 717/168 |
| 2021/0209046 A1* | 7/2021 | Lefebvre | G06F 9/4411 |

FOREIGN PATENT DOCUMENTS

TW     200951819 A     12/2009

OTHER PUBLICATIONS

OA letter of a counterpart TW application (appl. No. 110138774) mailed on Jun. 10, 2022.2) Summary of the TW OA Letter in regard to the TW counterpart application:(1) Claim(s) 1-8 is/are rejected under Patent Law Article 22(2) as Claim correspondence between the TW counterpart application and the instant US application: Claims 1-8 in the TW counterpart application correspond to claims 1-8 in the instant US application, respectively.

\* cited by examiner

*Primary Examiner* — Robert J Michaud
(74) *Attorney, Agent, or Firm* — WPAT, P.C

(57) ABSTRACT

A display updating system and a display are provided. The display updating system includes a display and an electronic device. The display includes a display panel, a USB hub, and a display control circuit. The USB hub is configured to receive a plurality of display program codes through a USB interface. The display control circuit is configured to receive the display program codes from the USB hub and store the display program codes. The electronic device is connected to the display through the USB interface and includes a memory, a USB driver circuit, and a calculation circuit. The memory is configured to store the display program codes. The USB driver circuit is connected to the USB hub of the display through the USB interface. The calculation circuit is configured to control the USB driver circuit to transmit the display program codes through the USB interface.

6 Claims, 7 Drawing Sheets

DISPLAY UPDATING SYSTEM AND DISPLAY

BACKGROUND OF THE INVENTION

1. Field of the Invention

The present invention generally relates to displays (which may sometimes be referred to as monitors), and, more particularly, to display updating systems.

2. Description of Related Art

FIG. 1 shows a conventional electronic system 100 which includes an electronic device 110, an in-system programming (ISP) board 120, and a display 130. The electronic device 110 includes a Universal Serial Bus (USB) driver circuit 116 and runs the operating system 112. The ISP board 120 includes a USB converter circuit 122. The display 130 includes a display control circuit 132 (e.g., a scaler integrated circuit (IC)) and a display panel 134. When the firmware of the display control circuit 132 needs to be updated, the application 114 run on the operating system 112 controls the USB driver circuit 116 to transmit the data related to firmware updating to the ISP board 120 through the USB interface 140, then the USB converter circuit 122 in the ISP board 120 converts the USB signal into a display data channel (DDC) signal, and then the DDC signal is transmitted through the display data channel 150 included in the video stream interface (e.g., a video interface such as DisplayPort (DP) or high definition multimedia interface (HDMI)) to the display control circuit 132 for firmware update.

The electronic system 100 has the following disadvantages: (1) high cost, because the ISP board 120 increases the cost of the system; (2) inconvenience, because, after the update of the firmware is completed, the ISP board 120 must be removed to connect the video stream interface of the display 130 to the video stream interface of the electronic device 110, so that the display 130 can operate normally; and (3) time-consumption and inconvenience when updating multiple displays 130, because the electronic system 100 can only update one display 130 at a time.

SUMMARY OF THE INVENTION

In view of the issues of the prior art, an object of the present invention is to provide display updating systems and displays, so as to make an improvement to the prior art.

According to one aspect of the present invention, a display updating system is provided. The display updating system includes a display and an electronic device. The display includes a display panel, a USB hub, and a display control circuit. The USB hub is configured to receive a plurality of display program codes through a USB interface. The display control circuit is coupled to the display panel and the USB hub and configured to receive the display program codes from the USB hub and store the display program codes. The electronic device is connected to the display through the USB interface and includes a memory, a USB driver circuit, and a calculation circuit. The memory stores the display program codes. The USB driver circuit is connected to the USB hub of the display through the USB interface. The calculation circuit is coupled to the memory and the USB driver circuit and configured to control the USB driver circuit to transmit the display program codes through the USB interface.

According to another aspect of the present invention, a display updating system is provided. The display updating system includes a display and an electronic device. The display includes a display panel and a display control circuit. The display control circuit is coupled to the display panel and includes a USB hub control circuit which provides a USB port coupled to a USB interface. The display control circuit receives a plurality of display program codes through the USB interface and stores the display program codes. The electronic device is connected to the display through the USB interface and includes a memory, a USB driver circuit, and a calculation circuit. The memory stores the display program codes. The USB driver circuit is connected to the display control circuit of the display through the USB interface. The calculation circuit is coupled to the memory and the USB driver circuit and configured to control the USB driver circuit to transmit the display program codes through the USB interface.

According to still another aspect of the present invention, a display is provided. The display includes a display panel, a USB hub, and a display control circuit. The USB hub receives a plurality of display program codes through a USB interface. The display control circuit is coupled to the display panel and the USB hub and configured to receive the display program codes from the USB hub and store the display program codes.

The display updating systems and the displays of the present invention use the USB interface as the interface for transmitting the display program codes; therefore, the conventional ISP board is not required, and multiple displays can form a display network through the USB interface. Compared to the conventional technology, the display updating systems and the displays of the present invention improve the convenience of firmware updating and can save cost and time.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes display updating systems and displays. On account of that some or all elements of the display updating systems and displays could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

Figure 1:
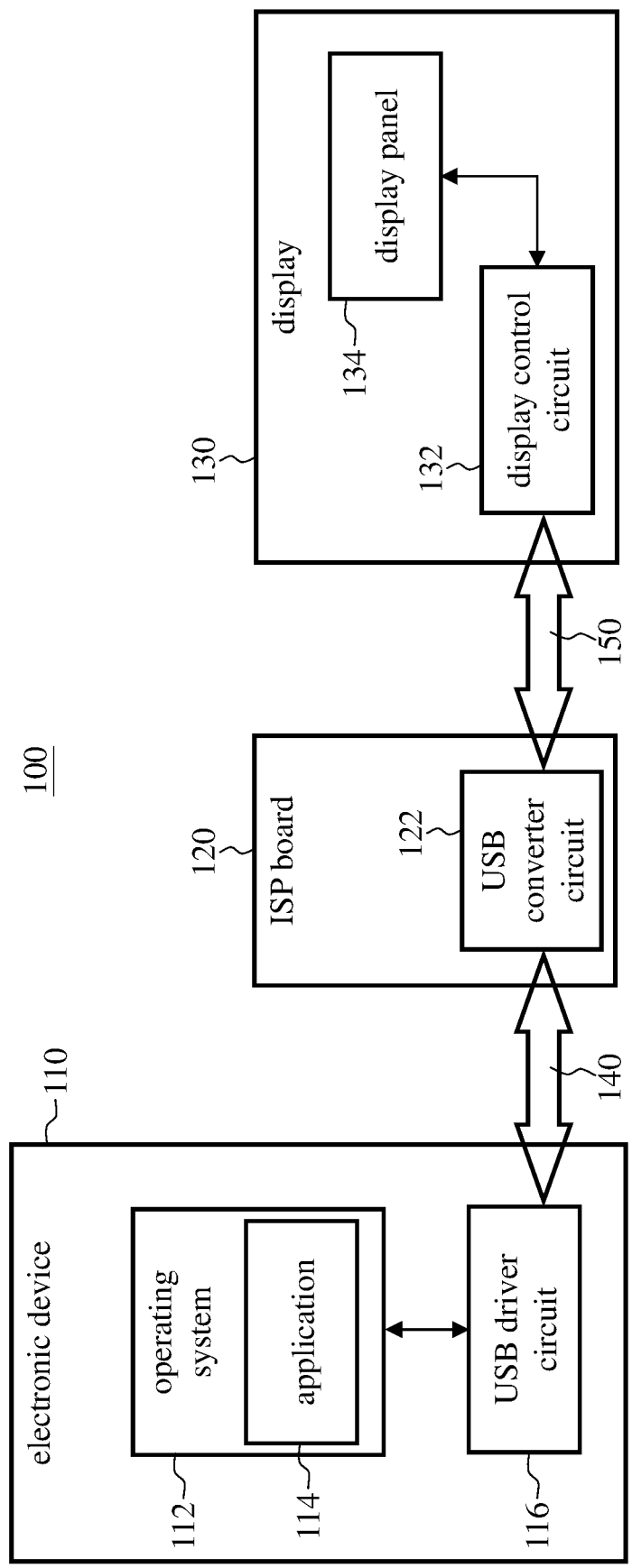
FIG. 1 is a conventional electronic system.
Figure 2:
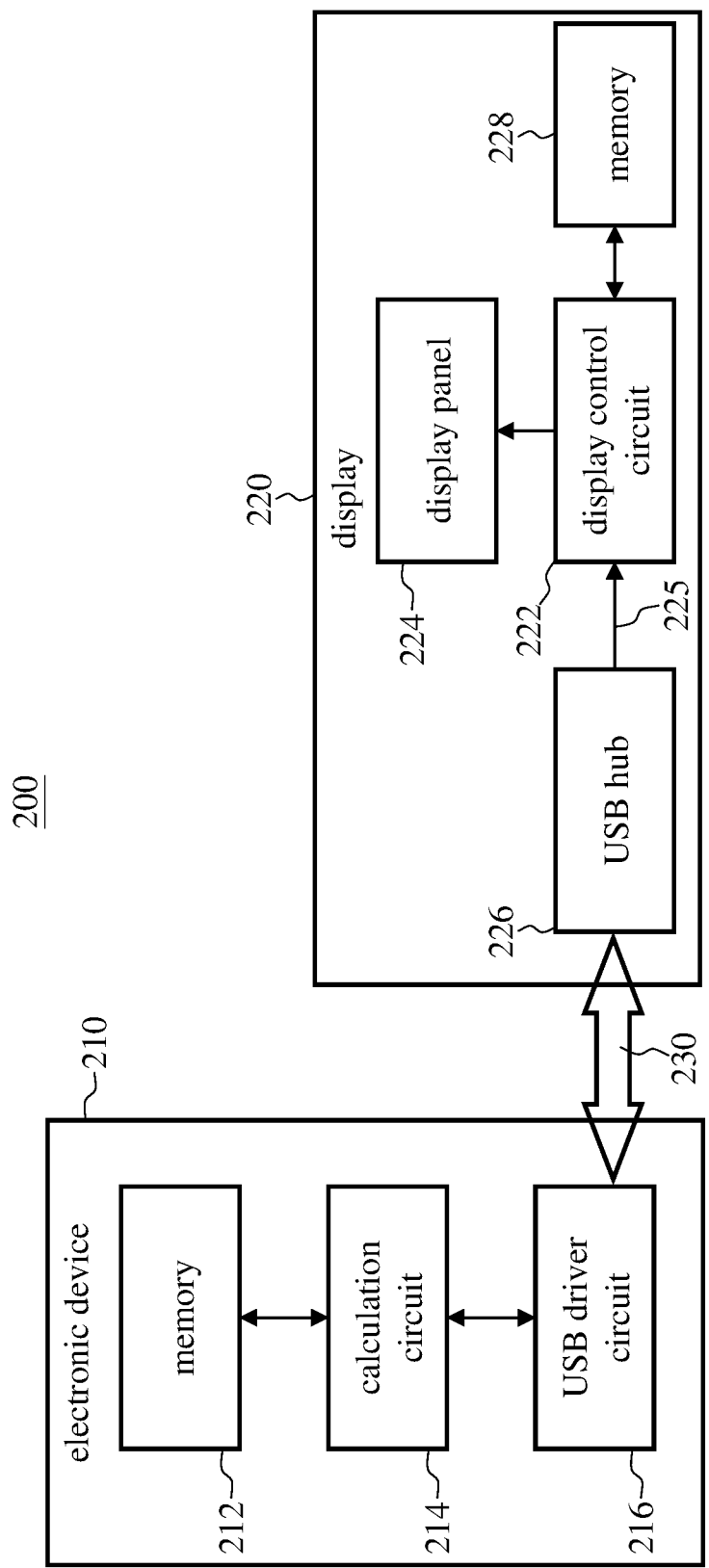
FIG. 2 is a functional block diagram of the display updating system according to an embodiment of the present invention.

FIG. 2 is a functional block diagram of the display updating system according to an embodiment of the present invention. The display updating system 200 includes an electronic device 210 and a display 220. The electronic device 210 and the display 220 are connected through the USB interface 230. The electronic device 210 includes a memory 212, a calculation circuit 214, and a USB driver circuit 216. The display 220 includes a display control circuit 222, a display panel 224, a USB hub 226, and a memory 228. The USB hub 226 is built in the display 220 and can be used as a USB expansion port of the electronic device 210. Signals or data are transmitted between the display control circuit 222 and the USB hub 226 through Inter-Integrated Circuit ($I^2C$) bus interface 225. In some embodiments, the display control circuit 222, the USB hub 226, and the memory 228 are arranged on the same circuit board, with the $I^2C$ bus interface 225 being the wires on the circuit board.

Figure 3:
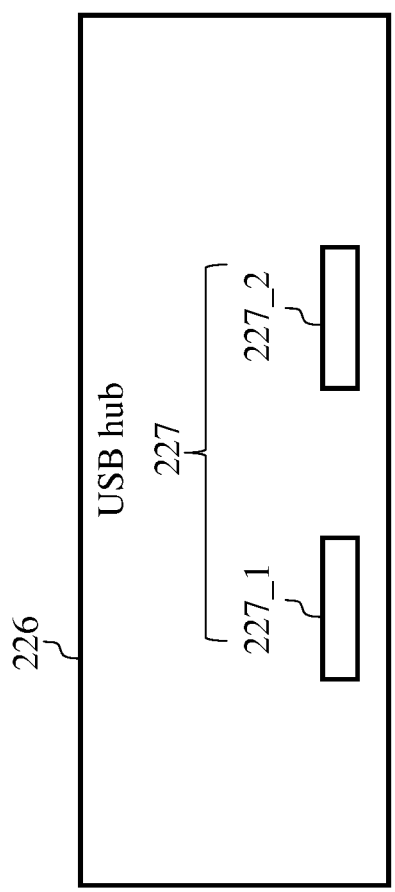
FIG. 3 is a schematic diagram of a USB hub according to an embodiment.

Reference is made to FIG. 3, which is a schematic diagram of the USB hub 226 according to an embodiment. The USB hub 226 includes a plurality of USB ports 227 (including a USB port 227_1 and a USB port 227_2), which can be USB interfaces or physical USB sockets. In some embodiments, the electronic device 210 and the display 220 are separate devices, and the USB interface 230 is a physical USB cable that connects the electronic device 210 and one of the USB ports (e.g., the USB port 227_1) of the USB hub 226.

Reference is made back to FIG. 2. The display control circuit 222, which is coupled to the display panel 224, executes the program codes of the display 220 (e.g., firmware, hereinafter referred to as display program codes) to carry out the functions of the display 220 (including but not limited to controlling the display panel 224 to display images). The USB hub 226 can convert the signals from the USB interface 230 to the $I^2C$ bus interface 225 and vice versa, namely, convert the signals from the USB format to the $I^2C$ bus format and vice versa. The conversion operation is well known to people having ordinary skill in the art, and its details are thus omitted for brevity.

The calculation circuit 214 is coupled to the memory 212 and the USB driver circuit 216. The memory 212 stores a plurality of program codes or program instructions which may be the operating system and application(s) of the electronic device 210. The calculation circuit 214 carries out the functions of the electronic device 210 by executing the program codes or program instructions. The memory 212 further stores the display program codes. When the firmware of the display control circuit 222 needs to be updated, the calculation circuit 214 of the electronic device 210 reads the display program codes in the memory 212, and then controls the USB driver circuit 216 to package the display program codes into the USB format and transmit the display program codes in the USB format through the USB interface 230. After the USB hub 226 receives the display program codes in the USB format through the USB interface 230, the USB hub 226 converts the display program codes in the USB format into the display program codes in the $I^2C$ bus format, and then transmits the display program codes in the $I^2C$ bus format to the display control circuit 222 through the $I^2C$ bus interface 225 to update the firmware of the display control circuit 222. In some embodiments, the display control circuit 222 stores the display program codes in the memory 228. In other embodiments, the memory 228 may be included in the display control circuit 222, that is, the display control circuit 222 has a built-in memory.

Figure 4:
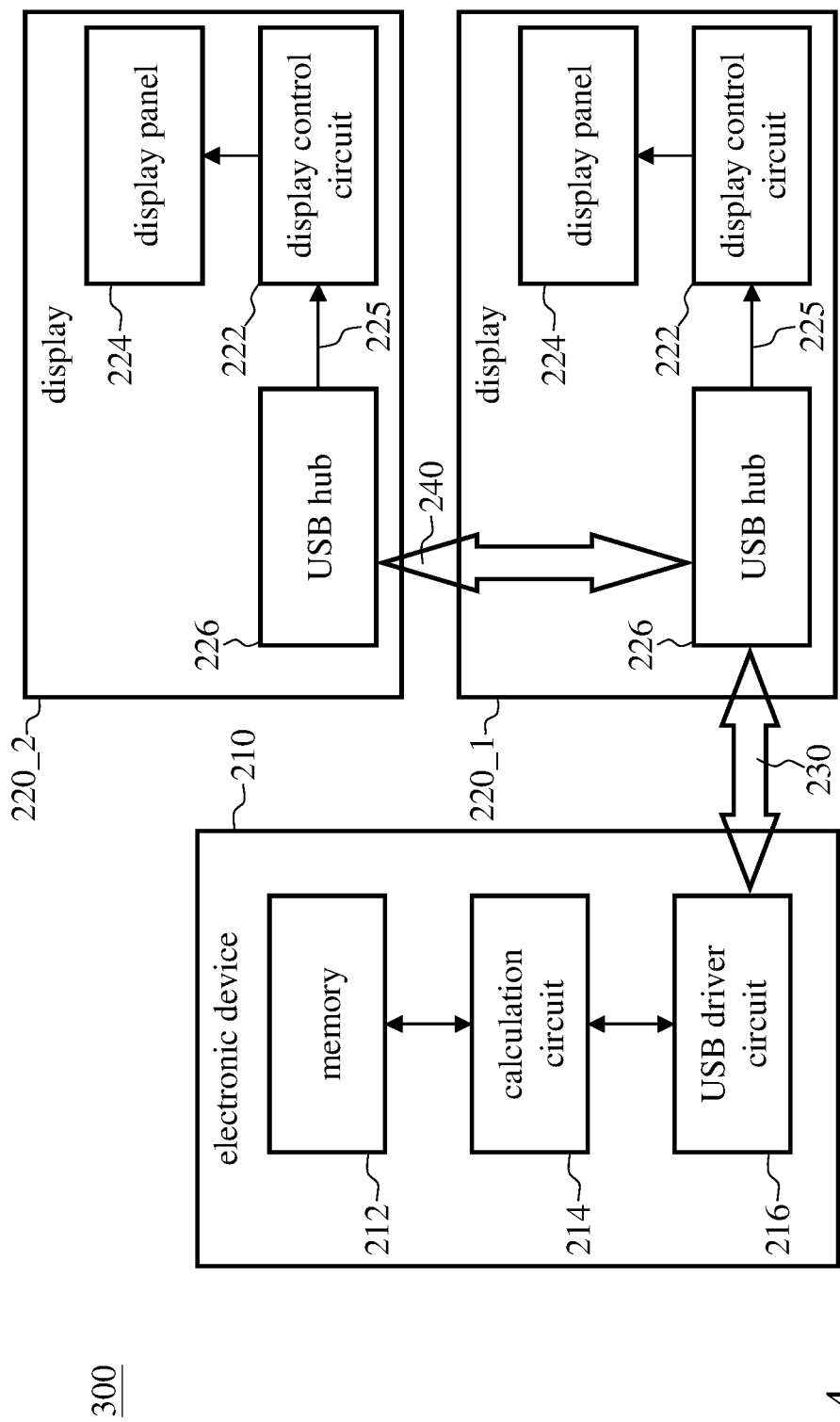
FIG. 4 is a functional block diagram of the display updating system according to another embodiment of the present invention.

FIG. 4 is a functional block diagram of the display updating system according to another embodiment of the present invention. The display updating system 300 includes an electronic device 210, a display 220_1, and a display 220_2. The display 220_1 and the display 220_2 are identical to the display 220 of FIG. 3. In this embodiment, the USB hub 226 of the display 220_1 and the USB hub 226 of the display 220_2 are connected through the USB interface 240. Therefore, the display program codes transmitted by the electronic device 210 to the display 220_1 through the USB interface 230 can be further transmitted to the display 220_2 through the USB interface 240. In some embodiments, the USB interface 240 is a physical USB cable that connects one of the USB ports (e.g., the USB port 227_2) of the USB hub 226 of the display 220_1 and one of the USB ports (e.g., the USB port 227_1) of the USB hub 226 of the display 220_2; therefore, a display network of multiple displays can be formed. In this way, the electronic device 210 can update the firmware of multiple displays at once as long as it is connected to any display in the display network, which greatly improves the convenience of firmware update and saves time.

Figure 5:
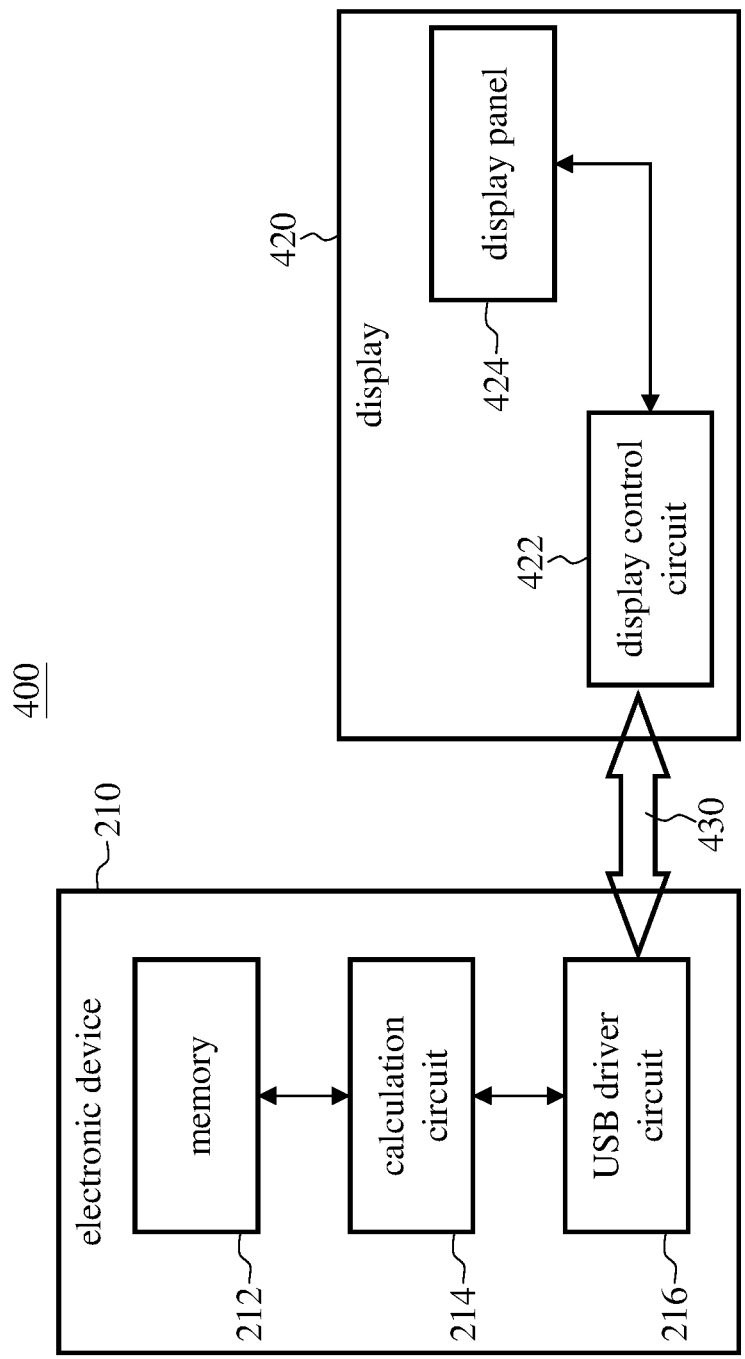
FIG. 5 is a functional block diagram of the display updating system according to another embodiment of the present invention.

FIG. 5 is a functional block diagram of the display updating system according to another embodiment of the present invention. The display updating system 400 includes the electronic device 210 and the display 420. The electronic device 210 and the display 420 are connected through the USB interface 430. The electronic device 210 of FIG. 4 is identical to the electronic device 210 of FIG. 2. The display 420 includes a display control circuit 422 and a display panel 424. The display control circuit 422, which is coupled to the display panel 424, controls the display panel 424 to display images.

Figure 6:
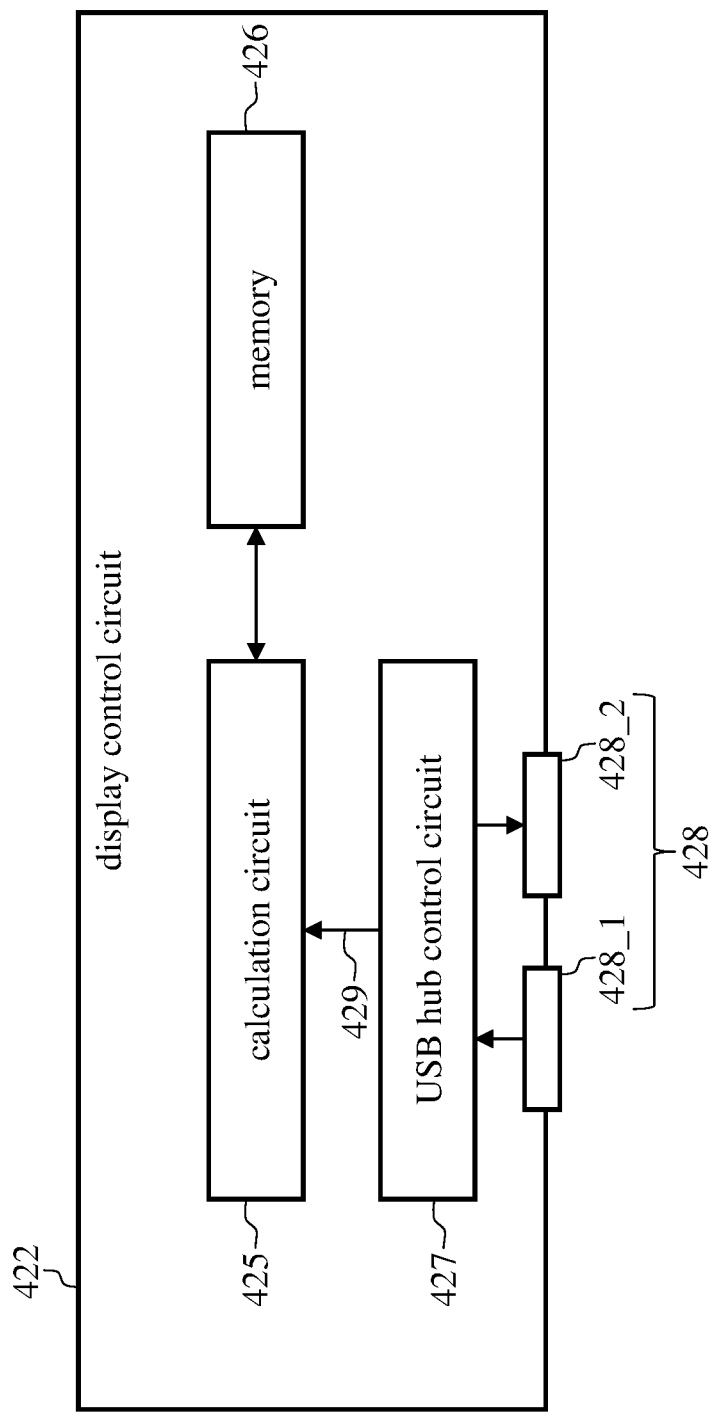
FIG. 6 is a functional block diagram of the display control circuit according to an embodiment of the present invention.

FIG. 6 shows a functional block diagram of the display control circuit according to an embodiment of the present invention. The display control circuit 422 includes a calculation circuit 425, a memory 426, and a USB hub control circuit 427. The calculation circuit 425 is coupled to the memory 426 and the USB hub control circuit 427. The USB hub control circuit 427 provides a plurality of USB ports 428 (including a USB port 428_1 and a USB port 428_2), which can be USB interfaces. In some embodiments, the USB port 428_1 and the USB port 428_2 each include some pins (not shown) of the display control circuit 422, and these pins are connected to the physical USB sockets through the wires on the circuit board (not shown). Signals or data are transmitted between the calculation circuit 425 and the USB hub control circuit 427 through the $I^2C$ bus interface 429. In other words, the USB hub control circuit 427 can convert the signals from the USB interface to the $I^2C$ bus interface and vice versa, namely, convert the signals from the USB format to the I²C bus format and vice versa. The calculation circuit 425 receives the display program codes through the I²C bus interface 429 and stores the display program codes in the memory 426 to complete the firmware update.

In some embodiments, the electronic device 210 and the display 420 are separate devices, and the USB interface 430 is a physical USB cable that connects the electronic device 210 and one of the USB ports (e.g., the USB port 428_1) of the display control circuit 422.

Because the display control circuit 422 has a built-in USB hub control circuit 427, the USB driver circuit 216 of the electronic device 210 can be connected to the display control circuit 422 through the USB interface 430. That is, the display control circuit 422 can directly receive the display program codes through the USB interface 430 to update firmware.

Figure 7:
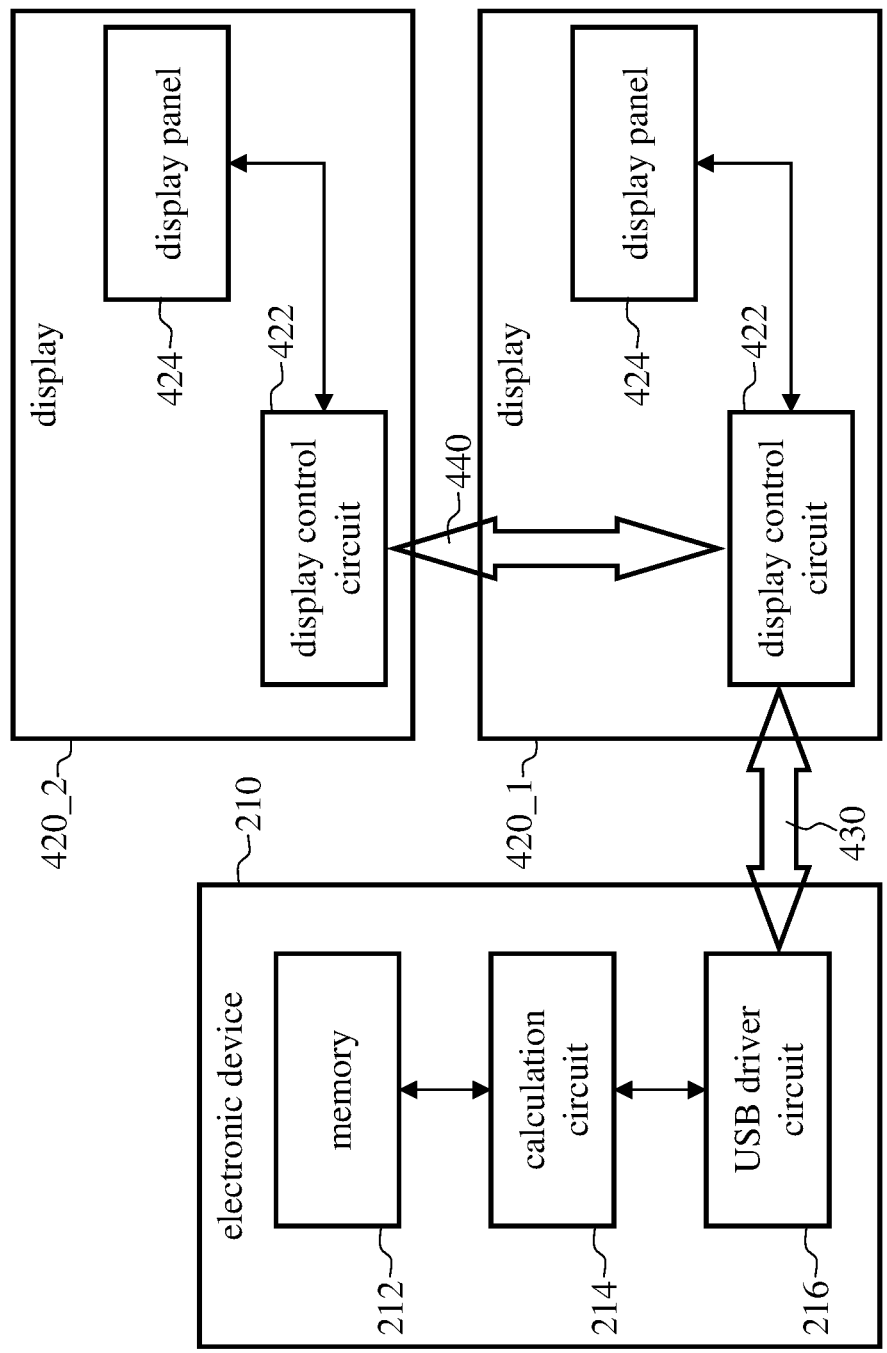
FIG. 7 is a functional block diagram of the display updating system according to another embodiment of the present invention.

FIG. 7 is a functional block diagram of the display updating system according to another embodiment of the present invention. The display updating system 500 includes the electronic device 210, a display 420_1, and a display 420_2. The display 420_1 and the display 420_2 are identical to the display 420 of FIG. 5. In this embodiment, the display control circuit 422 of the display 420_1 and the display control circuit 422 of the display 420_2 are connected through the USB interface 440. Therefore, the display program codes transmitted by the electronic device 210 to the display 420_1 through the USB interface 430 can be further transmitted to the display 420_2 through the USB interface 440. In some embodiments, the USB interface 440 is a physical USB cable that connects one of the USB ports (e.g., the USB port 428_2) of the display control circuit 422 of the display 420_1 and one of the USB ports (e.g., the USB port 428_1) of the display control circuit 422 of the display 420_2; therefore, a display network of multiple displays can be formed. In this way, the electronic device 210 can update the firmware of multiple displays at once as long as it is connected to any display in the display network, which greatly improves the convenience of firmware update and saves time.

To sum up, since the hardware and firmware of the USB driver circuit, USB hub, and USB interface are not updated frequently, the present invention has the following advantages compared to the conventional method of updating the display through the ISP board: higher data transmission stability, lower hardware cost, and easier to use. Furthermore, when multiple displays are connected through USB hub(s) to form a display network, the present invention can update multiple displays at once.

The calculation circuit 214 and the calculation circuit 425 may be circuits or electronic components with program execution capabilities, such as central processing units, microprocessors, microcontrollers, micro processing units, digital signal processors (DSPs), or their equivalents. The calculation circuit 214 and the calculation circuit 425 respectively carry out the functions of the electronic device 210 and the display control circuit 422 by executing the program codes (or program instructions) stored in the memory 212 or the memory 426. In other embodiments, people having ordinary skill in the art can design the calculation circuit 214 and the calculation circuit 425 according to the above discussions; that is to say, the calculation circuit 214 and the calculation circuit 425 may be application specific integrated circuits (ASICs) or embodied by circuits or hardware such as programmable logic devices (PLDs).

Although the foregoing embodiments are exemplified by the I²C bus, this is not a limitation to the present invention. People having ordinary skill in the art can use other types of signal interfaces or formats to implement the embodiments according to the discussions made above.

Please note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A system, comprising:
   a display including:
      a display panel;
      a USB hub configured to receive a plurality of display program codes through a USB interface; and
      a display control circuit electrically coupled to the display panel and the USB hub and configured to receive the display program codes from the USB hub and store the display program codes; and
   an electronic device electrically coupled to the display through the USB interface, the electronic device including:
      a memory for storing the display program codes;
      a USB driver circuit electrically coupled to the USB hub of the display through the USB interface; and
      a calculation circuit electrically coupled to the memory and the USB driver circuit and configured to control the USB driver circuit to transmit the display program codes through the USB interface.

2. The system of claim 1, wherein the USB hub and the display control circuit are electrically coupled through an Inter-Integrated Circuit (I²C) bus interface.

3. The system of claim 1, wherein the display is a first display, the display panel is a first display panel, the USB hub is a first USB hub, the display control circuit is a first display control circuit, and the USB interface is a first USB interface, the system further comprising:
   a second display, including:
      a second display panel;
      a second USB hub electrically coupled to the first USB hub through a second USB interface and receiving the display program codes through the second USB interface; and
      a second display control circuit electrically coupled to the second display panel and the second USB hub and configured to receive the display program codes from the second USB hub and store the display program codes.

4. A system, comprising:
   a display, including:
      a display panel; and
      a display control circuit electrically coupled to the display panel, wherein the display control circuit includes a USB hub control circuit which provides a USB port electrically coupled to a USB interface, and the display control circuit receives a plurality of display program codes through the USB interface and stores the display program codes; and an electronic device which is electrically coupled to the display through the USB interface and includes:
 a memory for storing the display program codes;
 a USB driver circuit electrically coupled to the display control circuit of the display through the USB interface; and
 a calculation circuit electrically coupled to the memory and the USB driver circuit and configured to control the USB driver circuit to transmit the display program codes through the USB interface.

5. The system of claim 4, wherein the calculation circuit is a first calculation circuit, the display control circuit further comprising:
 a second calculation circuit electrically coupled to the USB hub control circuit;
 wherein the second calculation circuit and the USB hub control circuit are electrically coupled through an Inter-Integrated Circuit ($I^2C$) bus interface.

6. The system of claim 4, wherein the display is a first display, the display panel is a first display panel, the display control circuit is a first display control circuit, the USB port is a first USB port, the USB hub control circuit is a first USB hub control circuit, and the USB interface is a first USB interface, the system further comprising:
 a second display, including:
 a second display panel; and
 a second display control circuit electrically coupled to the second display panel, wherein the second display control circuit includes a second USB hub control circuit which provides a second USB port electrically coupled to a second USB interface, and the second display control circuit is electrically coupled to the first display control circuit through the second USB port and the second USB interface;
 wherein the second display control circuit receives the display program codes through the second USB interface and stores the display program codes.

* * * * *